(12) United States Patent
Goswami et al.

(10) Patent No.: US 11,252,036 B1
(45) Date of Patent: Feb. 15, 2022

(54) SYSTEM FOR EVALUATING AND TUNING RESOURCES FOR ANTICIPATED DEMANDS

(71) Applicant: Bank of America Corporation, Charlotte, NC (US)

(72) Inventors: Debraj Goswami, Hyderabad (IN); Madhu Bhimavarapu, Hyderabad (IN); Anupama Panakanti, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/344,641

(22) Filed: Jun. 10, 2021

(51) Int. Cl.
*H04L 12/24* (2006.01)
*H04L 12/26* (2006.01)
*G06Q 10/06* (2012.01)

(52) U.S. Cl.
CPC .. *H04L 41/0883* (2013.01); *G06Q 10/063112* (2013.01); *H04L 41/0816* (2013.01); *H04L 41/145* (2013.01); *H04L 41/22* (2013.01); *H04L 41/5016* (2013.01); *H04L 41/5038* (2013.01); *H04L 43/062* (2013.01); *H04L 43/0882* (2013.01)

(58) Field of Classification Search
CPC ..... G06Q 10/06–06316; H04L 41/0876–0886; H04L 41/12–145; H04L 41/50–5038
See application file for complete search history.

(56) References Cited

U.S. PATENT DOCUMENTS

| | | | | |
|---|---|---|---|---|
| 7,814,206 B1 * | 10/2010 | Foldvik | ............... | H04L 41/0883 709/226 |
| 9,204,319 B2 * | 12/2015 | Ouyang | ................ | H04W 24/02 |
| 9,218,207 B1 * | 12/2015 | Neuse | ................... | G06F 9/5016 |
| 9,875,169 B2 * | 1/2018 | Ashby, Jr | ............ | G06F 11/3442 |
| 10,320,644 B1 * | 6/2019 | Chen | ..................... | H04L 41/083 |
| 10,884,813 B2 | 1/2021 | Yang et al. | | |
| 10,891,161 B2 | 1/2021 | Zhou et al. | | |

(Continued)

FOREIGN PATENT DOCUMENTS

WO WO-2016083842 A1 * 6/2016 ......... H04L 41/0896

OTHER PUBLICATIONS

Goswami, D. et al., "System for Automatically Balancing Anticipated Infrastructure Demands," U.S. Appl. No. 17/344,586, filed Jun. 10, 2021, 45 pages.

*Primary Examiner* — Brendan Y Higa

(57) ABSTRACT

An infrastructure management subsystem receives a selection of a planned configuration of the computing infrastructure and a baseline demand that includes a current usage of computing resources of the computing infrastructure. The infrastructure management subsystem determines an anticipated turbulence. The anticipated turbulence includes a quantitative indication of anticipated fluctuations in future infrastructure demand as a function of time. The infrastructure management subsystem determines an effective turbulence for the planned infrastructure configuration. The effective turbulence includes a quantitative indication of anticipated fluctuations in future infrastructure availability. The infrastructure management subsystem determines a configuration score corresponding to an extent to which the anticipated fluctuations in the effective turbulence destructively interfere with the anticipated fluctuations in the anticipated turbulence.

20 Claims, 5 Drawing Sheets

(56) References Cited

U.S. PATENT DOCUMENTS

| | | |
|---|---|---|
| 10,938,535 B2 | 1/2021 | Segev et al. |
| 10,908,960 B2 | 2/2021 | Qiu et al. |
| 10,908,967 B2 | 2/2021 | Schmidt et al. |
| 10,925,009 B2 | 2/2021 | Gutierrez et al. |
| 10,929,198 B2 | 2/2021 | Liu |
| 10,936,978 B2 | 3/2021 | Tijerina et al. |
| 10,938,738 B2 | 3/2021 | Dronen et al. |
| 10,938,741 B2 | 3/2021 | Hathorn et al. |
| 10,939,167 B2 | 3/2021 | Chao |
| 10,939,450 B2 | 3/2021 | Baldemair et al. |
| 10,942,776 B2 | 3/2021 | Ma et al. |
| 10,949,259 B2 | 3/2021 | Geigel |
| 10,965,535 B2 | 3/2021 | Ramareddy et al. |
| 10,966,249 B2 | 3/2021 | Lin et al. |
| 10,970,115 B2 | 4/2021 | Goyal et al. |
| 10,972,532 B2 | 4/2021 | Stelmar Netto et al. |
| 10,973,005 B2 | 4/2021 | Wei et al. |
| 10,977,082 B2 | 4/2021 | Wada et al. |
| 10,977,083 B2 | 4/2021 | Hari |
| 10,979,318 B2 | 4/2021 | Meyer et al. |
| 10,990,445 B2 | 4/2021 | Earl et al. |
| 10,999,216 B2 | 5/2021 | Oliveira et al. |
| 10,999,846 B2 | 5/2021 | Lunttila et al. |
| 10,999,859 B2 | 5/2021 | Tang |
| 2004/0162753 A1* | 8/2004 | Vogel .................. G06Q 10/06 705/7.14 |
| 2014/0019961 A1* | 1/2014 | Neuse .................. G06F 9/5077 718/1 |
| 2014/0304396 A1* | 10/2014 | Della .................. H04L 41/147 709/224 |
| 2016/0269239 A1* | 9/2016 | Ashby, Jr ............. H04L 41/0823 |
| 2018/0309636 A1* | 10/2018 | Strom ................ H04L 43/0882 |
| 2020/0074323 A1* | 3/2020 | Martin ................ G06F 9/5061 |
| 2021/0089362 A1 | 3/2021 | Iwasa et al. |
| 2021/0100023 A1 | 4/2021 | Wei et al. |
| 2021/0105197 A1 | 4/2021 | Balle et al. |
| 2021/0111843 A1 | 4/2021 | Zhang |
| 2021/0112546 A1 | 4/2021 | Adamou et al. |
| 2021/0117219 A1 | 4/2021 | Iwasa et al. |
| 2021/0120571 A1 | 4/2021 | Li et al. |
| 2021/0126984 A1 | 4/2021 | Parekh et al. |
| 2021/0127359 A1 | 4/2021 | Takeda et al. |
| 2021/0127366 A1 | 4/2021 | Liang et al. |
| 2021/0127417 A1 | 4/2021 | Lee et al. |
| 2021/0132994 A1 | 5/2021 | Casey et al. |
| 2021/0135969 A1 | 5/2021 | Casey et al. |
| 2021/0136006 A1 | 5/2021 | Casey et al. |
| 2021/0136178 A1 | 5/2021 | Casey et al. |
| 2021/0136753 A1 | 5/2021 | Liu et al. |
| 2021/0136785 A1 | 5/2021 | Elsayed et al. |
| 2021/0173719 A1* | 6/2021 | Chester ................ G06F 9/5022 |

\* cited by examiner

SYSTEM FOR EVALUATING AND TUNING RESOURCES FOR ANTICIPATED DEMANDS

TECHNICAL FIELD

The present disclosure relates generally to computing infrastructure management. More particularly, the present disclosure is related to a system for evaluating and tuning resources for anticipated demands.

BACKGROUND

Computing resources—including hardware, such as processing cores, memory, display devices, and input devices, and software such as applications and operating systems—are used to perform computing tasks for analyzing information, presenting information, storing information, and the like. For example, a certain amount of processing resources and memory may be used to execute software that is used to analyze and/or present information, and a particular operating system may be needed to execute the software.

SUMMARY

Previous technology used to manage computing resources can be inefficient and unreliable, particularly in the face of changing demands over time. For example, previous technology is unable to anticipate future changes in infrastructure demand, such as changes over time of the future need for the availability of computational hardware and/or software to certain users. Previous technology also fails to provide reliable tools for evaluating how effective new or modified infrastructure resource configurations will be at meeting anticipated computing needs.

Certain embodiments of this disclosure provide unique solutions to technical problems of previous computing infrastructure management technology, including those problems identified above by providing tools for reliably and efficiently determining infrastructure configurations that will effectively counter-balance anticipated future changes in demand from a number of users. For example, the disclosed system(s) provide several technical advantages over previous technology, which include: (1) ensuring necessary computing resources are available to meet an anticipated future need by automatically implementing a specially devised infrastructure configuration that counterbalances anticipated future workloads; (2) reducing or eliminating redundant or wasted resources using the counter-balancing infrastructure configuration; and (3) facilitating the reliable and efficient evaluation of planned or modified infrastructure configurations for meeting anticipated needs in the future. As such, this disclosure may improve the function of computer systems used to help manage computing infrastructures, such that the appropriate hardware (e.g., processing, memory, and networking resources), software, and/or other (e.g., skilled workers, workstations, workspaces, etc.) are available to meet future needs.

In certain embodiments, this disclosure may particularly be integrated into a practical application of an infrastructure management subsystem, which uses a turbulence-based approach to identify appropriate future infrastructure configurations that efficiently and reliably counter-balance future workloads or computing demands, such that the appropriate infrastructure is available to the appropriate users with significantly reduced waste of resources. The infrastructure management subsystem also reduces or eliminates cases in which there is an inadvertent deficit of resources to meet future demands. In certain embodiments, this disclosure may be integrated into a practical application of an infrastructure management subsystem that facilitates the automatic evaluation of a planned infrastructure configuration (e.g., a planned distribution of hardware, software, and/or other resources amongst a number of users). This evaluation provides insights into whether the planned configuration will meet anticipated demands and may further provide recommendations for modifying the configuration to more effectively meet anticipated demands with little or no waste of resources.

Certain embodiments of this disclosure may include some, all, or none of these advantages. These advantages and other features will be more clearly understood from the following detailed description taken in conjunction with the accompanying drawings and claims.

In an embodiment, a system includes a controller device and an infrastructure management subsystem. The controller device receives a selection of an anticipated future change to one or more characteristics of a baseline demand. The baseline demand includes a current usage of computing resources by a computing infrastructure. The infrastructure management subsystem manages the computing infrastructure. The infrastructure management subsystem includes a communications interface that receives the baseline demand and the anticipated future change to the one or more characteristics of the baseline demand. A processor of the infrastructure management subsystem is communicatively coupled to the communications interface. The processor determines, based at least in part on the baseline demand and the anticipated future change to the baseline demand, an anticipated turbulence. The anticipated turbulence includes a quantitative indication of anticipated fluctuations in future infrastructure demand as a function of time. The processor determines a counter-balancing turbulence for the anticipated turbulence. The counter-balancing turbulence includes counter-balancing fluctuations that destructively interfere with the anticipated fluctuations of the anticipated turbulence. The processor determines one or more infrastructure configurations indicating a distribution of one or more of processing resources, memory resources, network communication resources, and application resources amongst users of the computing infrastructure in order to achieve the counter-balancing turbulence. One of the determined infrastructure configurations is automatically implemented.

In another embodiment, a system includes a computing infrastructure with a plurality of computing resources configured to implement computing tasks. An infrastructure management subsystem is operable to manage the computing infrastructure. The infrastructure management subsystem includes a communications interface receives a selection of a planned configuration of the computing infrastructure. The planned configuration includes an indication of availability and allocation of the computing resources to users during future times. The communications interface receives a baseline demand that includes a current usage of computing resources of the computing infrastructure. A processor of the infrastructure management subsystem is communicatively coupled to the communications interface. The processor determines, based at least in part on the baseline demand and the anticipated future change to the baseline demand, an anticipated turbulence. The anticipated turbulence includes a quantitative indication of anticipated fluctuations in future infrastructure demand as a function of time. The processor determines, based at least in part on the planned infrastructure configuration, an effective turbulence for the planned infrastructure configuration. The effective turbulence includes a quantitative indication of anticipated fluctuations in future infrastructure availability. The processor determines, based at least in part on a comparison of the anticipated turbulence to the effective turbulence, a configuration score corresponding to an extent to which the anticipated fluctuations in the future infrastructure availability of the effective turbulence destructively interfere with the anticipated fluctuations in the future infrastructure demand of the anticipated turbulence. The processor provides the configuration score for presentation. In response to receiving a confirmation to execute the planned infrastructure configuration, the planned infrastructure configuration is automatically implemented at the computing infrastructure.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technology fails to provide tools for efficiently and reliably managing computing infrastructure. For example, if there is a future change in the volume or frequency of the workload that has to be handled by the computing infrastructure, previous technology fails to provide an approach to appropriately adjust the computing infrastructure to meet the upcoming workload. This disclosure provides a new approach to infrastructure management in which one or more possible infrastructure configurations are automatically determined that will meet a workload that is anticipated in the future. The determined configuration may involve reallocation of the computing resources (e.g., processing, memory, and/or networking resources) that are available over future times to a number of users, reallocation of software (e.g., and the requisite hardware) amongst a number of users at future times, reallocation of other resources (e.g., number of computer workstations, number of skilled workers, availability of workspaces, etc.) amongst a number of users at future times. By automatically adjusting the infrastructure to counter-balance the future workload, the workload can be handled without waste of resources and without downtimes or delays when resources would have been insufficiently provided using previous technology.

Infrastructure Management System

Figure 1:
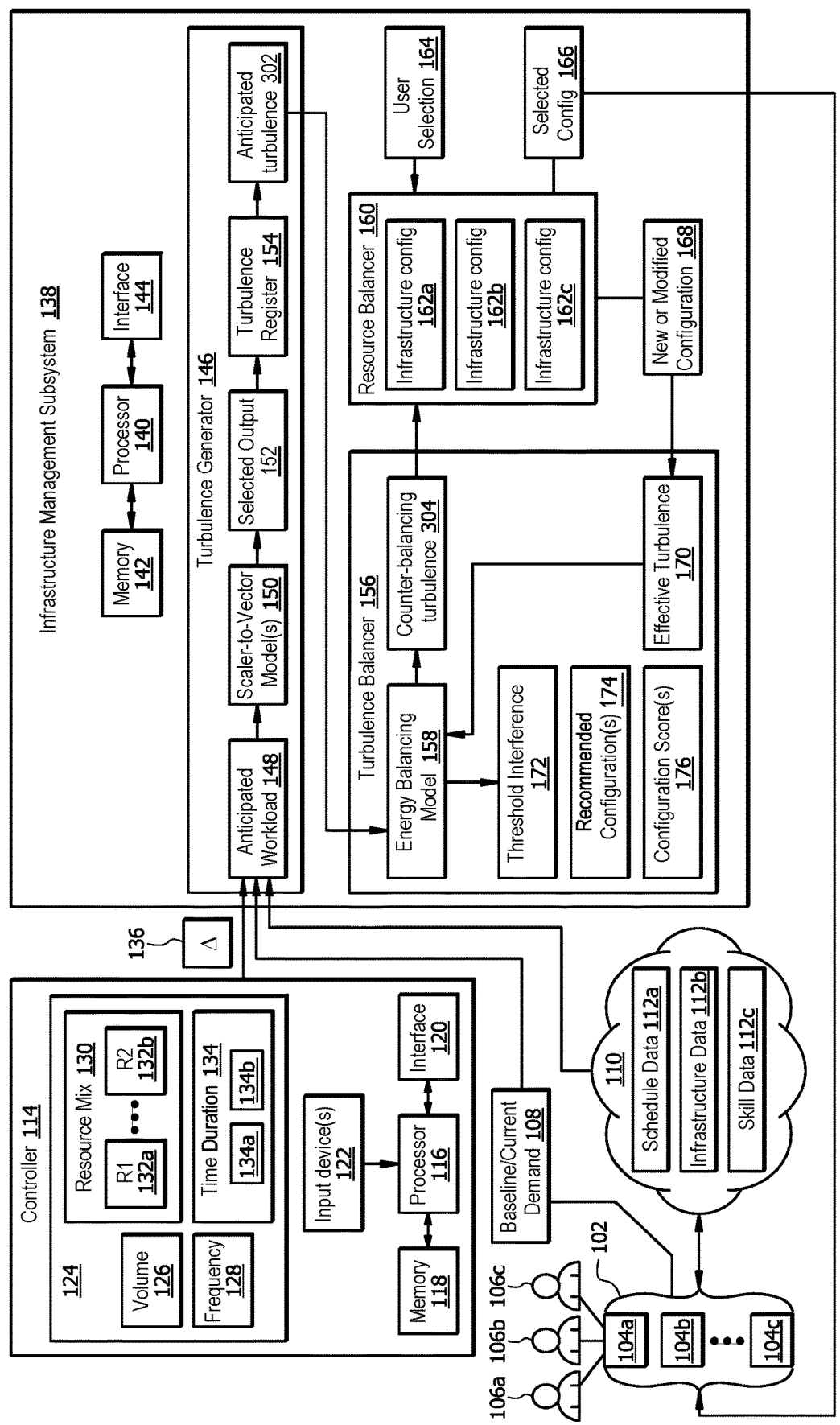
FIG. 1 is a schematic diagram of an example computing infrastructure management system.

FIG. 1 is a schematic diagram of an example system 100 for improving the management of computing infrastructure 102. The system 100 includes a computing infrastructure 102, a distributed data sources 110, a controller device 114, and an infrastructure management subsystem 138. As described in greater detail below with respect to FIGS. 2-5, the system 100 generally facilitates the determination of one or more infrastructure configurations 162a-c that are appropriate for counter-balancing (e.g., providing the appropriate distribution of resources 104a-c amongst users 106a-c) an anticipated workload 148. The anticipated workload 148 is determined from predefined changes 136 to a baseline or current demand 108 of the computing infrastructure 102. These counter-balancing infrastructure configurations 162a-c help ensure that the anticipated workload 148 is always met with the waste of fewer of the computing resources 104a-c of the computing infrastructure than was possible using previous technology. The system 100 also facilitates the evaluation of a planned infrastructure configuration 168, such that a configuration score 176 can be determined that measures the effectiveness of the planned infrastructure configuration 168 for satisfying an anticipated workload 148, as described further below with respect to FIGS. 1 and 5.

Computing Infrastructure

The computing infrastructure 102 may include any number of computing resources 104a-c that are used by users 106a-c to perform tasks. For example, the resources 104a-c may facilitate the review of requests processed by the users 106a-c, data analysis performed by the users 106a-c and the like. These computing resources 104a-c may include hardware resources (e.g., processors, memory, network interfaces, computing devices, servers, etc.), software resources (e.g., applications used by users 106a-c), and other resources that are associated with completing tasks using the computing infrastructure 102 (e.g., workspace in which users 106a-c can work). The computing infrastructure 102 may include a plurality of resources 104a-c.

As an example, a processing resource 104a-c may include one or more processors, which may include any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). As another example, a memory resource 104a-c may include one or more disks, tape drives, or solid-state drives. Memory resources 104a-c may include volatile and/or non-volatile and may comprise read-only memory (ROM), random-access memory (RAM), ternary content-addressable memory (TCAM), dynamic random-access memory (DRAM), and static random-access memory (SRAM). As yet another example, a networking resource 104a-c may include network devices, such as WIFI interfaces, local area network (LAN) interfaces, wide area network (WAN) interfaces, modems, switches, routers, and the like. Computing device resources 104a-c may include a number of computing devices (e.g., implemented using the processing, memory, and networking resources 104a-c described above) that are configured to implement computing tasks (e.g., as directed by users 106a-c). Server resources 104a-c may be implemented using a plurality of the computing device resources 104a-c. Other resources 104a-c may be the skills of the users 106a-c (e.g., to perform certain tasks, use certain software, etc.), number of users 106a-c, workspaces in which users 106a-c can work to perform tasks, computer workstations on which the users 106a-c can work to perform tasks, and the like.

The baseline demand 108 is a measure of the current usage of the resources 104a-c at the computing infrastructure 102. For example, the baseline demand 108 may indicate an amount of processing resources 104a-c being consumed, an amount of memory resources 104a-c being consumed, an amount of networking resources 104a-c being consumed, an amount of other resources (e.g., servers, skills, people, workspace, etc.) being consumed. Baseline demand 108 may be provided to the infrastructure management subsystem 138 from the computing infrastructure via any appropriate wired and/or wireless communication.

In some cases, additional information is provided to the infrastructure management subsystem 138 from other data sources 110. Data sources 110 are illustrated in a cloud in the example of FIG. 1, because the data sources 110 can be distributed amongst different locations and throughout many different repositories, databases, devices, and the like. Data sources 110 generally store records of various data 112a-c that describe characteristics or attributes of the resources 104a-c available to the computing infrastructure 102. For example, schedule data 112a may include information about future scheduled maintenance during which processor, memory, and/or networking resources 104a-c will be unavailable, holidays during which users 106a-c will be unavailable, events during which increases or decreases in workflows are expected, and the like. Infrastructure data 112b may include information about the set of resources 104a-c available and the available tools or applications available at those resources 104a-c. For example, if a particular software resource 104a-c is available through a given hardware resource 104a-c, then this may be indicated in the infrastructure data 112b. Skill data 112c may include information about the skills required to operate a given application or software package and/or the skills held by the various users 106a-c of the computing infrastructure 102. Data 112a-c may be provided to the infrastructure management subsystem 138 from the computing infrastructure via any appropriate wired and/or wireless communication.

Controller Device

The controller device 114 generally allows a user to input information associated with anticipated future changes 136 to the baseline demand 108. The controller device 114 may include a processor 116, memory 118, communications interface 120, and one or more input devices 122. The controller device 114 is generally configured to receive a user input, via input device(s) 122, corresponding to selection of an anticipated future change 136 to one or more characteristics 124 of the baseline demand 108 of the computing infrastructure 102. As described further above, the baseline demand 108 is generally a measure of the current and/or recent usage of the computing resources 104a-c of the computing infrastructure 102.

Examples of the characteristics 124 of the baseline demand 108 that are adjusted by the controller device 114 include the volume 126 of work, a frequency 128 of work, a resource mix 130 that will be available, and a time duration 134 corresponding to the duration of the changes in characteristics 124 that are anticipated in the future. The volume 126 of work may define a number of jobs, or computing tasks, expected to be encountered during a future time (e.g., during a time frame defined by the time duration 134). For instance, the volume 126 may indicate an expectation for the need to process a first number of documents or requests of a first type and a second number of documents or requests of a second type. The frequency 128 generally defines the time within which the volume 126 is anticipated to be received, or how rapidly the volume 126 of work will be received. The resource mix 130 defines the availability of various resources 132a,b during a future time. The resources 132a,b correspond to the amount of infrastructure resources 104a-d anticipated to be available during future times (e.g., as defined by the time duration 134). For example, the resources 132a,b of the resource mix 130 may include computing resources (e.g., servers, computing devices, processors, memory, etc.), space resources (e.g., available office or other working space), skill resources (e.g., the training and experience of workers to use certain applications, programming languages, etc.), and any other resources associated with the completion of tasks by users 106a-c using computing infrastructure 102. As alluded to above, the time duration 134 defines a future time frame during which the selected values of volume 126, frequency 128, and resource mix 130 are defined. For example, one set of volume 126, frequency 128, and resource mix 130 may be defined for a first time duration 134a, while another set of these values 126, 128, 130 is defined for a second time duration 134b. This process may be repeated to provide these values 126, 128, 130 for any number of time durations 134 corresponding to spans of future time.

The selected values of volume 126, frequency 128, resource mix 130, and time duration 134 are provided to the infrastructure management subsystem 138 as a change 136 to the baseline demand 108 of the computing infrastructure 102. The change 136 represents anticipated future perturbations to the baseline demand 108 at various times in the future (e.g., as indicated by the frequency 128 and time duration 134 of the input characteristics 124). The infrastructure management subsystem 138 uses this change 136 along with the baseline demand 108 and the data 112a-c from data sources 110 to determine anticipated workload 148, as described in greater detail below. The processor 116 of the controller device 114 includes one or more processors.

The processor 116 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 116 may be a programmable logic device, a microcontroller, a microprocessor, or any suitable combination of the preceding. The processor 116 is communicatively coupled to and in signal communication with the memory 118, communications interface 120, and input device(s) 122. The one or more processors are configured to process data and may be implemented in hardware and/or software. For example, the processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory 118 and executes them by directing the coordinated operations of the ALU, registers and other components. In an embodiment, the function of the controller device 114 described herein is implemented using logic units, FPGAs, ASICs, DSPs, or any other suitable hardware or electronic circuitry.

The memory 118 of the controller device 114 is operable to store any data, instructions, logic, rules, or code operable to execute the functions of the controller device 114. The memory 118 includes one or more disks, tape drives, or solid-state drives, and may be used as an over-flow data storage device, to store programs when such programs are selected for execution, and to store instructions and data that are read during program execution. The memory 118 may be volatile or non-volatile and may comprise read-only memory (ROM), random-access memory (RAM), ternary content-addressable memory (TCAM), dynamic random-access memory (DRAM), and static random-access memory (SRAM).

The communications interface 120 of the controller device 114 is configured to enable wired and/or wireless communications. The communications interface 120 is configured to communicate data between the controller device 114 and other network devices, systems, or domain(s), such as the infrastructure management subsystem 138. The communications interface 120 is an electronic circuit that is configured to enable communications between devices. For example, the communications interface 120 may include one or more serial ports (e.g., USB ports or the like) and/or parallel ports (e.g., any type of multi-pin port) for facilitating this communication. As a further example, the communications interface 120 may comprise a network interface such as a WIFI interface, a local area network (LAN) interface, a wide area network (WAN) interface, a modem, a switch, or a router. The processor 116 is configured to send and receive data using the communications interface 120. The communications interface 120 may be configured to use any suitable type of communication protocol as would be appreciated by one of ordinary skill in the art. The communications interface 120 communicates the anticipated changes 136 to the baseline demand 108 (e.g., as provided via selected values of volume 126, frequency 128, resource mix 130, and time duration 134 at the input device(s) 122) to the infrastructure management subsystem 138, as described above).

The input device(s) 122 of the controller device 114 include any device, component, or mechanism of the controller device 114 operable to receive a user selection and provide the user input to the processor 116. For example, an input device 122 may be a computer mouse, a computer keyboard, a button, a switch, a knob, or any combination of one or more of these. In some cases, the input device 122 is a touchscreen. A selection at the input device(s) 122 may be used to provide values of the volume 126, frequency 128, resource mix 130, and time duration 134 that are described above.

Infrastructure Management Subsystem

The infrastructure management subsystem 138 is generally configured to receive the baseline demand 108, changes 136 provided at the controller device 114, and data 112*a-c* from data sources 110; use this information to determine an anticipated workload 148; transform this anticipated workload 148 into an anticipated turbulence 302, which provides a quantitative measure of fluctuations in demand of the computing infrastructure 102 (see FIG. 3); and use the anticipated turbulence 302 to determine one or more infrastructure configurations 162*a-c* that will counter-balance anticipated changes in future demand of the computing infrastructure 102. These counter-balancing infrastructure configurations 162*a-c* ensure that future demand is met with little or no waste of resources 104*a-c* available to the computing infrastructure 102, as described further below and with respect to FIGS. 2 and 4. The infrastructure management subsystem 138 may also or alternatively facilitate the evaluation of a planned infrastructure configuration 168 for the computing infrastructure 102, such that desired changes can be implemented more efficiently and reliably than was possible using previous technology and without downtimes for testing and trial-and-error based approaches, as described further below and with respect to FIG. 5.

The infrastructure management subsystem 138 includes a processor 140, memory 142, and communications interface 144. The processor 140 of the infrastructure management subsystem 138 includes one or more processors. The processor 140 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 140 may be a programmable logic device, a microcontroller, a microprocessor, or any suitable combination of the preceding. The processor 140 is communicatively coupled to and in signal communication with the memory 142, and communications interface 144. The one or more processors are configured to process data and may be implemented in hardware and/or software. For example, the processor 140 may be 8-bit, 16-bit, 32-bit, 64-bit or of any other suitable architecture. The processor 140 may include an arithmetic logic unit (ALU) for performing arithmetic and logic operations, processor registers that supply operands to the ALU and store the results of ALU operations, and a control unit that fetches instructions from memory 142 and executes them by directing the coordinated operations of the ALU, registers and other components. In an embodiment, the function of the infrastructure management subsystem 138 described herein is implemented using logic units, FPGAs, ASICs, DSPs, or any other suitable hardware or electronic circuitry.

The memory 142 of the infrastructure management subsystem 138 is operable to store any data, instructions, logic, rules, or code operable to execute the functions of the infrastructure management subsystem 138. The memory 142 includes one or more disks, tape drives, or solid-state drives, and may be used as an over-flow data storage device, to store programs when such programs are selected for execution, and to store instructions and data that are read during program execution. The memory 142 may be volatile or non-volatile and may comprise read-only memory (ROM), random-access memory (RAM), ternary content-addressable memory (TCAM), dynamic random-access memory (DRAM), and static random-access memory (SRAM).

The communications interface 144 of the infrastructure management subsystem 138 is configured to enable wired and/or wireless communications. The communications interface 144 is configured to communicate data between the infrastructure management subsystem 138 and other network devices, systems, or domain(s), such as the controller device 114, data sources 110, and computing infrastructure 102. The communications interface 144 is an electronic circuit that is configured to enable communications between devices. For example, the communications interface 144 may include one or more serial ports (e.g., USB ports or the like) and/or parallel ports (e.g., any type of multi-pin port) for facilitating this communication. As a further example, the communications interface 144 may comprise a WIFI interface, a local area network (LAN) interface, a wide area network (WAN) interface, a modem, a switch, or a router. The processor 140 is configured to send and receive data using the communications interface 144. The communications interface 144 may be configured to use any suitable type of communication protocol as would be appreciated by one of ordinary skill in the art. As described further below, the communications interface 144 communicates a selected infrastructure configuration 166 for its implementation at the computing infrastructure 102.

Example functions of the infrastructure management subsystem 138 are described in greater detail below with respect to the turbulence generator 146, turbulence balancer 156, and resource balancer 160.

Turbulence Generator

Functions of the turbulence generator 146 are executed using the processor 140, memory 142, and interface 144 of the infrastructure management subsystem 138. The turbulence generator 146 generally determines an anticipated workload 148, applies one or more scalar-to-vector-models 150 to the anticipated workload, and determines a selected vector output 152. The selected output 152 is generally an output of one of the scalar-to-vector models 150 that satisfies certain predefined criteria and/or is selected by an administrator of the infrastructure management subsystem 138, as described in greater detail with respect to FIG. 2 below. The selected output 152 is provided to a turbulence register 154 to determine an anticipated turbulence 302. For example, the turbulence generator 146 may employ a method of machine learning and/or artificial intelligence to determine the anticipated turbulence 302. As described in greater detail below and illustrated in FIG. 3, the anticipated turbulence 302 is a quantitative measure or indication of anticipated fluctuations in future demand or workload at the computing infrastructure 102 as a function of time. The anticipated turbulence 302 provides a single metric for expected future demand, and the determination of anticipated turbulence 302 facilitates improved determination of possible infrastructure configurations 162a-c by the resource balancer 160 that effectively counter-balance this demand with little or no waste of resources 104a-c.

Figure 2:
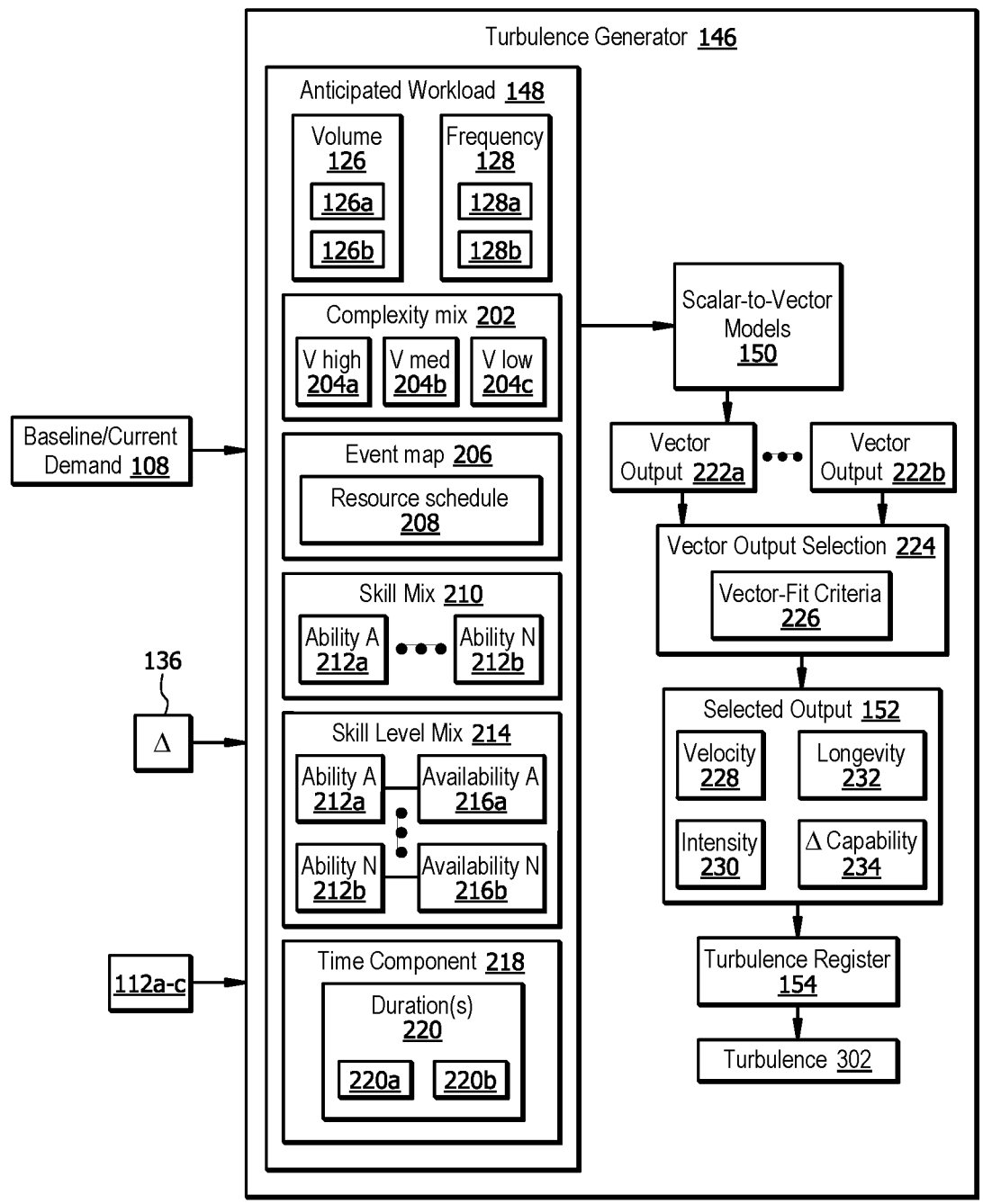
FIG. 2 is a flow diagram illustrating example operation of the turbulence generator of the system of FIG. 1.

FIG. 2 illustrates operations of the turbulence generator 146 in greater detail. The turbulence generator 146 determines the anticipated workload 148. The anticipated workload 148 is determined using the baseline demand 108 along with one or both of the demand changes 136 provided by the controller device 114 (see FIG. 1) and the data 112a-c from data sources 110. The anticipated workload 148 may include any number of characteristics including those illustrated in the example of FIG. 2, which includes a volume 126, frequency 128, a complexity mix 202, an event map 206, a skill mix 210, a skill level mix 214, and a time component 218, as illustrated in the example of FIG. 2. These characteristics are generally scalar, or unidimensional, values.

The volume 126, as described above, may be a number of jobs, or computing tasks, expected to be encountered during a future time (e.g., during a time frame defined by the duration 220, described below). The frequency 128 is the time within which the volume 126 is anticipated to be received, or how rapidly the volume 126 of work will be received. The complexity mix 202 defines the relative complexity of different volume portions 204a-c of the volume 126. For example, a first volume portion 204a of the anticipated workload 148 may be of a high complexity (e.g., involving applications and/or skills that require highly specialized training and/or skills), while a second volume portion 204b of the workload 148 may be of a medium complexity (e.g., involving applications and/or skills that require an intermediate level of training and/or skills). A third volume portion 204c of the workload 148 may be of a low complexity (e.g., involving applications and/or skills that require little or no specialized training and/or skills). The event map 206 defines upcoming events associated with the computing infrastructure 102. For example, the event map 206 may include a resource schedule 208 that defines anticipated availability and/or usage of the various resources 104a-c of the computing infrastructure 102. For instance, the resource schedule 208 may indicate times of scheduled downtimes (e.g., for maintenance) of processing, memory, and/or networking resources 104a-c at the computing infrastructure 102 (e.g., determined using the volume 126, frequency 128, and/or schedule data 112a of FIG. 1). As another example, the resource schedule 208 may indicate holidays or other downtimes during which users 106a-c will not be available to complete tasks (e.g., determined using the schedule data 112a of FIG. 1).

The skill mix 210 and skill level mix 214 define the various abilities 212a-c of the users 106a-c and/or the computing infrastructure 102 and the availability 216a,b of these abilities 212a,b (e.g., determined using the resource mix 130 and/or skill data 112c of FIG. 1). For example, one ability 212a may correspond to the ability of a given portion of the computing infrastructure 102 to execute a certain application used to complete certain workload tasks. The corresponding availability 216a may indicate a number of resources 104a-c available with this ability 212a. Another example ability 212b may be the ability of a user 106a-c to use a certain application (e.g., to be trained in the application). The corresponding availability 216b may correspond to the number of users 106a-c with such abilities 212b.

The time component 218 defines durations 220 of the various elements 126, 128, 202, 206, 210, 214, 218 of the anticipated workload 148 described above. For example, the time component 218 may define a duration 220 of a volume 126 and frequency 128 of the workload 148. For example, a first volume 126a and frequency 128a may be anticipated during a first duration 220a, while a second volume 126b and frequency 128b may be anticipated during a second duration 220b. Durations 220 may similarly define the anticipated time span of the availability 216a,b of abilities 212a,b. The duration 220 may correspond to the time durations 134 provided by the controller device 114 and/or may be determined from the data 112a-c from the data sources 110 (e.g., based on the schedule data 112a).

The anticipated workload 148 is then provide to the scalar-to-vector model(s) 150. The scalar-to-vector-models 140 generally include any appropriate models for transforming the unidimensional elements 126, 128, 202, 206, 210, 214, 218 of the anticipated workload 148 into the vector outputs 222a,b having multidimensional properties (e.g., the velocity 228, intensity 230, longevity 232, and change in capability 234 described below with respect to the selected output 152). The scalar-to-vector model(s) 150 output one or more vector outputs 222a,b. For example, one vector output 222a,b may be determined by each scalar-to-vector-model 150 that is employed. The vector outputs 222a,b may include vectorized representations of combinations of the characteristics included in the anticipated workload 148 (see description of selected output 152 below).

Vector output selection 224 may then be performed to determine a selected output 152 to use for determining the anticipated turbulence 302. Vector output selection 224 may be performed using vector-fit criteria 226, which define properties of the vector outputs 222a,b which must be satisfied in order for the vector outputs 222a,b to be considered a reliable representation of the anticipated workload 148. For example, the vector-fit criteria 226 may require that a goodness of fit metric for the vector output 222a,b be at least a threshold value. The vector output 222a,b that best satisfies the vector-fit criteria 226 may be determined as the selected output 152. The selected output 152 includes any number of vector workload characteristics, including a workload velocity 228, a workload intensity 230, a workload longevity 232, and a change in capability 234 shown in the example of FIG. 2. The workload velocity 228 is generally a representation of the change in volume of the workload over time (e.g., based on the volume 126, frequency 128, and duration 220 of the anticipated workload 148). The workload intensity 230 is generally a representation of the anticipated complexity of the workload 148 over time (e.g., based on the complexity mix 202, volume 126, and frequency 128 of the anticipated workload 148). The workload longevity 232 generally represents a time span during which the workload 148 can be maintained by the computing infrastructure 102. The change in capability 234 is generally a representation of the change in capabilities of the computing infrastructure 102 (e.g., available processing, memory, and/or networking resources 104a-c, availability of certain application resources 104a-c, availability of users 106a-c with certain skills, etc.). For instance, the change in capability 234 may be determined from the event map 206, skill mix 210, skill level mix 214, and time component 218 of the anticipated workload 148.

Figure 3:
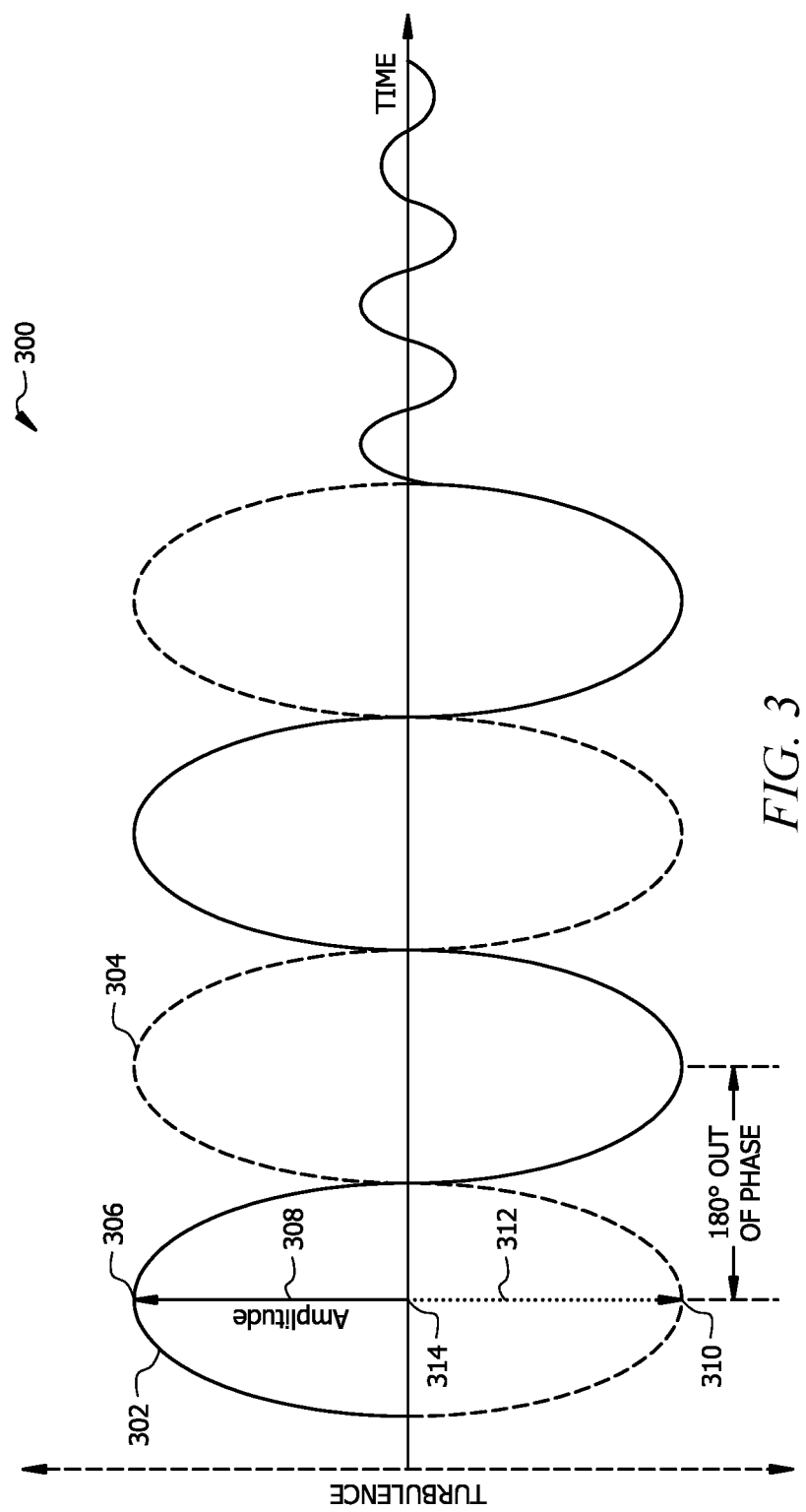
FIG. 3 is a plot of example anticipated and counter-balancing turbulences determined by the system of FIG. 1.

The selected output 152 is provide to the turbulence register 154. The turbulence register 154 transforms the selected output 152 (e.g., the various vector values 228, 230, 232, 234) into the anticipated turbulence 302. For example, the turbulence register 154 may employ a method of machine learning or artificial intelligence to determine the anticipated turbulence 302. As described with respect to the turbulence balancer 156 of FIG. 1 below (and as illustrated in FIG. 3), the anticipated turbulence 302 is a quantitative measure of anticipated fluctuations in workload in the future. The anticipated turbulence 302 facilitates efficient determination of one or more infrastructure configurations 162a-c by the resource balancer 160 that can be adopted to counteract or counter-balance the anticipated workload 148, such that demand is always met with little or no waste of the resources 104a-c of the computing infrastructure 102.

Turbulence Balancer and Resource Balancer

Returning to FIG. 1, the anticipated turbulence 302 is then provided to the turbulence balancer 156, which determines a counter-balancing turbulence 304 for the anticipated turbulence 302. The counter-balancing turbulence 304 includes counter-balancing fluctuations that destructively interfere (e.g., is about 180 degrees out of phase) with the anticipated fluctuations of the anticipated turbulence 302 (see FIG. 3). Functions of the turbulence balancer 156 are executed using the processor 140, memory 142, and interface 144 of the infrastructure management subsystem 138.

The example turbulence balancer 156 of FIG. 1 receives the anticipated turbulence 302 and employs an energy-balancing model 158 to determine a counter-balancing turbulence 304. The energy-balancing model 158 may determine a peak intensity and frequency of the anticipated turbulence 302 and use these, and optionally other properties of the anticipated turbulence 302 to determine the counter-balancing turbulence 304.

FIG. 3 shows an example plot 300 of an anticipated turbulence 302 and corresponding counter-balancing turbulence 304 determined by the energy-balancing model 158 of FIG. 1. The anticipated turbulence 302 includes fluctuations (e.g., diminishing sinusoidal fluctuations, as illustrated in FIG. 3) over time with a peaks 306 with amplitudes 308. The determined counter-balancing turbulence 304 is a measure with fluctuations over time that destructively interfere with the fluctuations of the anticipated turbulence 302, such that if the anticipated turbulence 302 and counter-balancing turbulence 304 were to be combined, little or no fluctuations would remain. In this example, the counter-balancing turbulence 304 has a trough 310 at the about the same time 314 as the peak 306 of the anticipated turbulence 302. The trough 310 has an amplitude 312 that is approximately the same (e.g., within a threshold range of) but in an opposite direction of the amplitude 308 of the anticipated turbulence 302.

Returning to FIG. 1, the determined counter-balancing turbulence 304 is provided to the resource balancer 160. Functions of the turbulence balancer 156 are executed using the processor 140, memory 142, and interface 144 of the infrastructure management subsystem 138. The resource balancer 160 determines one or more infrastructure configurations 162a-c that indicate distributions of the resources 104a-c of the computing infrastructure 102 (e.g., of processing, memory, network communication, and/or application resources 104a-c) that achieve the counter-balancing turbulence 304. In other words, the resource balancer 160 determines which resources 104a-c to make available to the different users 106a-c in order to appropriately respond to the fluctuations of anticipated workload 148 indicated by the anticipated turbulence 302. In some cases, the resource balancer 160 may further identify which users 106a-c to match to a given resource 104a-c, such that users 106a-c have appropriate skills for satisfying the anticipated workload 148.

This disclosure recognizes that without first transforming the anticipated workload 148 into a more computationally tractable anticipated turbulence 302, it would be impossible to efficiently and automatically determine infrastructure configurations 162a-c that can reliably satisfy anticipated workloads 148. Once the infrastructure configurations 162a-c are determined, the infrastructure configurations 162a-c may be presented for selection (e.g., by an administrator of the computing infrastructure 102). A user selection 164 of a selected configuration 166 may cause the selected configuration 166 to be automatically implemented. For instance, if the selected configuration 166 apportions additional processing, memory, and/or networking resources 104a-c to a given user 106a-c (e.g., to execute applications used by this user 106a), then this reallocation of resources 104a-c may be automatically implemented.

In some embodiments, the turbulence balancer 156 is configured to evaluate a planned infrastructure configuration 168. The planned configuration 168 may be a new configuration or a modification of the current configuration or one of the configurations 162a-c determined based on the counter-balancing turbulence 304, as described above. For example, the planned configuration 168 may include an indication of the availability and/or the allocation of computing resource 104a-c amongst users 106a-c during future times. The turbulence balancer 156 may determine an effective turbulence 170 for the planned configuration 168. The effective turbulence 170 is a quantitative indication of anticipated fluctuations in future infrastructure availability based on the planned configuration 168. The effective turbulence 170 may be determined as described above for the determination of anticipated turbulence 302 by the turbulence generator 146. For example, the turbulence balancer 156 may provide the planned configuration 168 to the turbulence generator 146 to determine the effective turbulence 170 using the same or a similar approach to that described above with respect to FIG. 2.

The turbulence balancer 156 then compares the anticipated turbulence 302 to the effective turbulence 170. The turbulence balancer 156 may determine whether the effective turbulence 170 comprises fluctuations that destructively interfere with the anticipated fluctuations of the anticipated turbulence 304 at least a threshold amount 172. For example, the threshold amount 172 may correspond to a requirement that the effective turbulence 170 destructively interferes with, or "cancels out," at least 70%, 80%, 90%, or more of the fluctuations of the anticipated turbulence 302. The turbulence balancer 156 then determines a configuration score 176 corresponding to an extent to which the anticipated fluctuations in future availability of the computing infrastructure 102 of the effective turbulence 170 destructively interfere with the anticipated fluctuations in future computing infrastructure demand associated with the anticipated turbulence 302. The turbulence balancer 156 may determine one or more recommended configurations 174 that are adjustments to the planned configuration 168 that will improve destructive interference between the anticipated turbulence 302 and the effective turbulence 170. The configuration score 176 and/or the recommended configuration 174 are provided for presentation (e.g., for viewing by an administrator of the computing infrastructure 102).

A user selection 164 may be received indicating a confirmation to execute the planned infrastructure configuration 168 (e.g., after the administrator has reviewed the configuration score 176 and/or any possible recommended configurations 174). When this confirmation is received, the infrastructure management subsystem 138 may automatically implement the planned infrastructure configuration 168 (e.g., with or without any of changes indicated by the recommended configuration 174) at the computing infrastructure 102. When the planned configuration 168 is implemented the availability of computing resources 104a-c of the computing infrastructure 102 may be adjusted for at least a portion of the users 106a-c.

In an example operation of the system 100 of FIG. 1, users 106a-c use the computing infrastructure 102 to complete tasks. For example, a first user 106a may access an application resource 104a that is used to present, analyze, and/or visualize information associated with the user's task. The application resource 104a may be executed using server resources 104b of the computing infrastructure 102. The user 106a may use a computing device resource 104c (e.g., a local computer workstation) to remotely access the application resource 104a. Users 106b,c may be performing the same or different tasks and using the same or different resources 104a-c to complete these tasks.

Information about the current usage of the resources 104a-c is provided to the infrastructure management subsystem 138 as the baseline demand 108. The baseline demand 108 generally includes a measure of resources 104a-c that are currently in use. The infrastructure management subsystem 138 uses information from the controller device 114 and/or the data sources 110 to plan and/or prepare for future changes in the demand 108 by determining the anticipated workload 148. For example, a user (e.g., an administrator of the computing infrastructure 102) may provide inputs at the controller device 114 corresponding to expected future changes 136 from the current baseline demand 108. As described above, these changes 136 may include expected volumes 126, frequencies 128, and resource mixes 130 during different time durations 134. For instance, the administrator may wish to identify an appropriate infrastructure configuration 162a-c in response to a sudden increase in work volume 126 during a given time duration 134. These entries may be provided through the controller device 114.

As another example, data 112a-c from the data sources 110 may provide information about the anticipated workload 148 during future times. For example, schedule data 112a may be provided that indicates when users 106a-c will and will not be available to work to complete tasks. Infrastructure data 112b indicates an amount of computing resources 104a-c, such as workstation devices, servers, applications, operating systems, and the like, that will be available at future times (e.g., based on planned maintenance, upgrades, and the like). The skill data 112c provides information about the skills of users 106a-c and the skills needed to complete certain tasks by using certain resources 104a-c (e.g., what skills are needed to use a certain application resource 104a-c).

The infrastructure management subsystem 138 integrates the baseline demand 108, controller-provided changes 136, and the data 112a-c to determine the anticipated workload 148, as described above with respect to FIGS. 1 and 2. As a non-limiting example, referring to both FIGS. 1 and 2, the infrastructure management subsystem 138 may determine measures of volume 126, frequency 128, and complexity mix 202 of workloads during a future time duration 220. The volume 126 and frequency 128 may be determined from the changes 136 provided by the controller device 114. The skill mix 210 may be determined from the skill data 112c by determining whether advanced skills are needed to complete tasks included in the volume 126 of work.

The anticipated workload 148 itself is generally not amenable to efficient analysis to automatically determine infrastructure configurations 162a-c. To overcome this, the infrastructure management subsystem 138 transforms the anticipated workload 148 first into a selected vector output 152 that represents the unidimensional elements 126, 128, 202, 206, 210, 214, 218 of the workload 148 as multidimensional vector values 228, 230, 232, 234 and then uses the selected vector output 152 to determine the anticipated turbulence 302. As described above, the anticipated turbulence 302 provides a quantitate measure of anticipated fluctuations in the workload that will be encountered by the computing infrastructure 102 in the future.

A counter-balancing turbulence 304 is then determined. The determined counter-balancing turbulence 304 is a measure with fluctuations over time that destructively interfere with the fluctuations of the anticipated turbulence 302, such that if the anticipated turbulence 302 and counter-balancing turbulence 304 were to be combined, little or no fluctuations would remain. The counter-balancing turbulence 304 is used to determine infrastructure configurations 162a-c that are appropriate for counter-balancing the anticipated workload 148 (e.g., by providing the appropriate distribution of resources 104a-c amongst users 106a-c).

A selected configuration 166 (e.g., as indicated by a user selection 164) is automatically implemented at the computing infrastructure 102. For example, a selected infrastructure configuration 162a may correspond to a first allocation of server resources 104a-c, local computer workstation resources 104a-c, and application resources 104a-c amongst the users 106a-c (e.g., or tasks assigned to the users 106a-c). The other infrastructure configurations 162b,c provide alternative allocations of these and/or other resources 104a-c to achieve a similar counter-balancing of the anticipated workload 148. For example, resources 104a-c that correspond to physical workspaces may be re-allocated to certain users 106a-c, such the users 106a-c may assigned to work in those spaces during a certain time. As another example, additional computer workstation device resources 104a-c may be provided at a certain location (and optionally removed from other locations) to ensure the anticipated workload 148 is met with little or no waste of resources 104a-c.

Example Method of Resource Balancing

Figure 4:
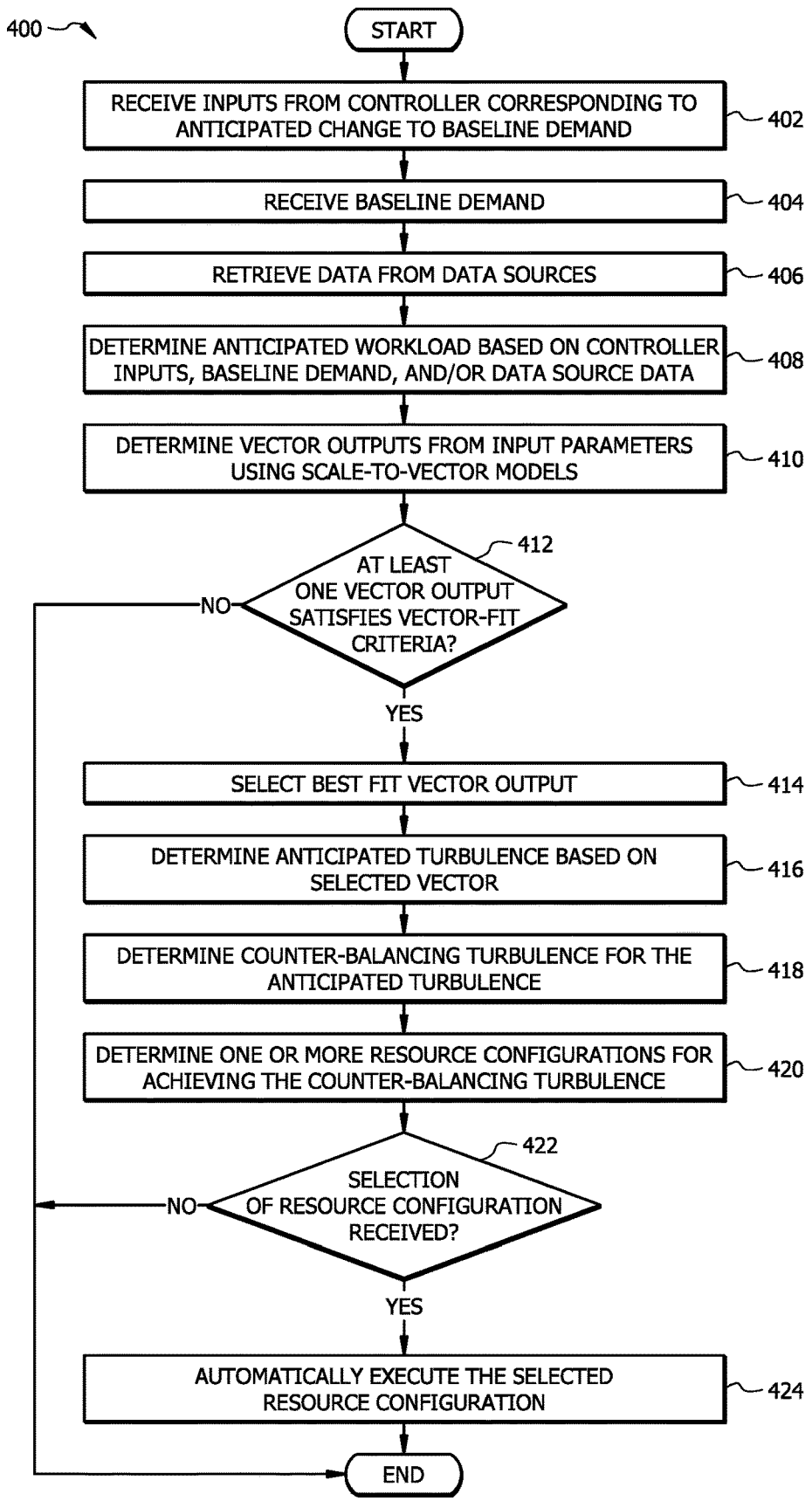
FIG. 4 is a flowchart of a method for determining and implementing an infrastructure configuration that counter-balances an anticipated workload using the system of FIG. 1.

FIG. 4 illustrates a method 400 for operating the system 100 of FIG. 1 in order to identify and implement an appropriately selected infrastructure configuration 166. Method 400 may improve the allocation of computing resources 104a-c in a computing infrastructure 102, such that a future anticipated workload 148 can be completed reliably with little or no waste of resources 104a-c. The method 400 may be executed by the processor 140, memory 142, and interface 144 of the infrastructure management subsystem 138. The method 400 may begin at step 402 where inputs are received at the controller device 114 corresponding to changes in the baseline demand 108. The inputs provide values of volume 126, frequency 128, resource mix 130, and time duration 134, which may be included in the change 136 to the baseline workload 108, as illustrated in FIG. 1.

At step 404, the baseline demand 108 is received. As described with respect to FIGS. 1 and 2 above, the baseline demand 108 is a measure of the current usage of the resources 104a-c at the computing infrastructure 102. For example, the baseline demand 108 may indicate an amount of processing resources 104a-c being consumed, an amount of memory resources 104a-c being consumed, an amount of networking resources 104a-c being consumed, an amount of other resources 104a-c (e.g., workspaces, etc.) being consumed.

At step 406, data 112a-c may be retrieved from data sources 110. As described above with respect to FIG. 1, the data sources 110 may be distributed amongst different locations and throughout many different repositories, databases, devices, and the like. Data sources 110 generally store records of various data 112a-c that describe characteristics or attributes of the resources 104a-c available to the computing infrastructure 102. Retrieval of data 112a-c may be achieved by providing a request for the data 112a-c and receiving a response that includes the requested data 112a-c. In some cases, the data 112a-c may be provided from the data sources 110 automatically (e.g., intermittently or on a predefined schedule).

At step 408, the anticipated workload 148 is determined using the information from steps 402, 404, and/or 406. For example, referring to the example of FIG. 2, the changes 136 to the baseline demand 108 from step 402 and the baseline demand 108 from step 404 may indicate an anticipated future volume 126, frequency 128, and/or complexity mix 202 for work anticipated to be encountered for various future time durations 220. As another example, the schedule data 112a from data sources 110 (see FIG. 1) may identify planned downtimes of users 106a-c of the computing infrastructure 102 during future time durations 220. In this case, the volume 126 of the anticipated workload 148 and/or skill availabilities 216a,b may be decreased during these scheduled downtimes. As yet another example, the infrastructure data 112b may identify planned downtimes of portions of the computing resource 104a-c of the computing infrastructure 102 during future time durations 220 (e.g., downtimes of processing, memory, and/or networking resources 104a-c, downtimes during which application and/or operating system resources 104a-c will be unavailable, and the like). In response, the resource schedule 208 may be adjusted to indicate these downtimes and/or the workload volume 126 may be decreased to indicate the anticipated durations 220 of decreased activity while computing resources 104a-c are unavailable. As a further example, the skill data 112c from data sources 110 may identify abilities (e.g., abilities 212a,b of FIG. 2) of various users 106a-c of the computing infrastructure 102 (e.g., abilities 212a,b to perform predefined tasks using application resources 104a-c expected to be executed by the computing infrastructure 102 during future time durations 220). In response, the skill mix 210 and skill level mix 214 of FIG. 2 may be adjusted, such that anticipated skill availability 216a,b reflects the skills of the users 106a-c.

At step 410, the anticipated workload 148 from step 408 is used to determine vector outputs 222a,b by applying the scalar-to-vector model 150 described with respect to FIGS. 1 and 2 above. At step 412, the infrastructure management subsystem 138 determines whether at least one of the vector outputs 222a,b satisfies the vector fit criteria 226. If none of the vector outputs 222a,b satisfies the vector fit criteria 226, the method 400 may end. Otherwise, if at least one of the vector outputs 222a,b satisfies the vector fit criteria 226, the infrastructure management subsystem 138 proceeds to step 414.

At step 414, the selected vector output 152 is determined. The selected vector output 152 may be the vector output 222a,b that best satisfies the vector fit criteria 226 and/or a vector output 222a,b that is selected by an administrator (e.g., via a user selection 164). At step 416, the anticipated turbulence 302 is determined from the selected output 152, as described in greater detail with respect to FIGS. 1 and 2 above. As described above, the anticipated turbulence 302 is a quantitative measure or indication of anticipated fluctuations in future demand or workload at the computing infrastructure 102 as a function of time. The anticipated turbulence 302 provides a single metric for expected future demand, and the determination of anticipated turbulence 302 facilitates improved determination of possible infrastructure configurations 162a-c that effectively counter-balance this demand with little or no waste of computing resources 104a-c.

At step 418, a counter-balancing turbulence 404 is determined for the anticipated turbulence 302. As described above, the counter-balancing turbulence 304 includes counter-balancing fluctuations that destructively interfere (e.g., is about 180 degrees out of phase) with the anticipated fluctuations of the anticipated turbulence 302 (see FIG. 3). The counter-balancing turbulence 304 may be determined as a sinusoidal fluctuation that destructively interferes with at least a threshold amount 172 of the fluctuations of the anticipated turbulence 302. At step 420, one or more infrastructure configurations 162a-c are determined that are appropriate for counter-balancing the anticipated workload 148 determined at step 408 (e.g., providing the appropriate distribution of computing resources 104a-c and/or users 106a-c to complete future work with little or no waste of resources 104a-c).

At step 422, the infrastructure management subsystem 138 determines whether a selection of one of the infrastructure configurations 162a-c is received. For example, the infrastructure management subsystem 138 may determine whether a user selection 164 is received of one of the infrastructure configurations 162a-c. If a user selection 164 is not received, the method 400 may end. If a user selection 164 is received, the infrastructure management subsystem 138 proceeds to step 424.

At step 424, the selected infrastructure configuration 162a-c is automatically implemented at the computing infrastructure 102. For instance, if the selected configuration 166 apportions additional processing, memory, and/or networking resources 104a-c to a given task and/or user 106a-c for a period of time (e.g., to execute applications used for this task and/or by this user 106a-c), then this reallocation of resources 104a-c may be automatically implemented at the computing infrastructure 102.

Example Method of Configuration Evaluation

Figure 5:
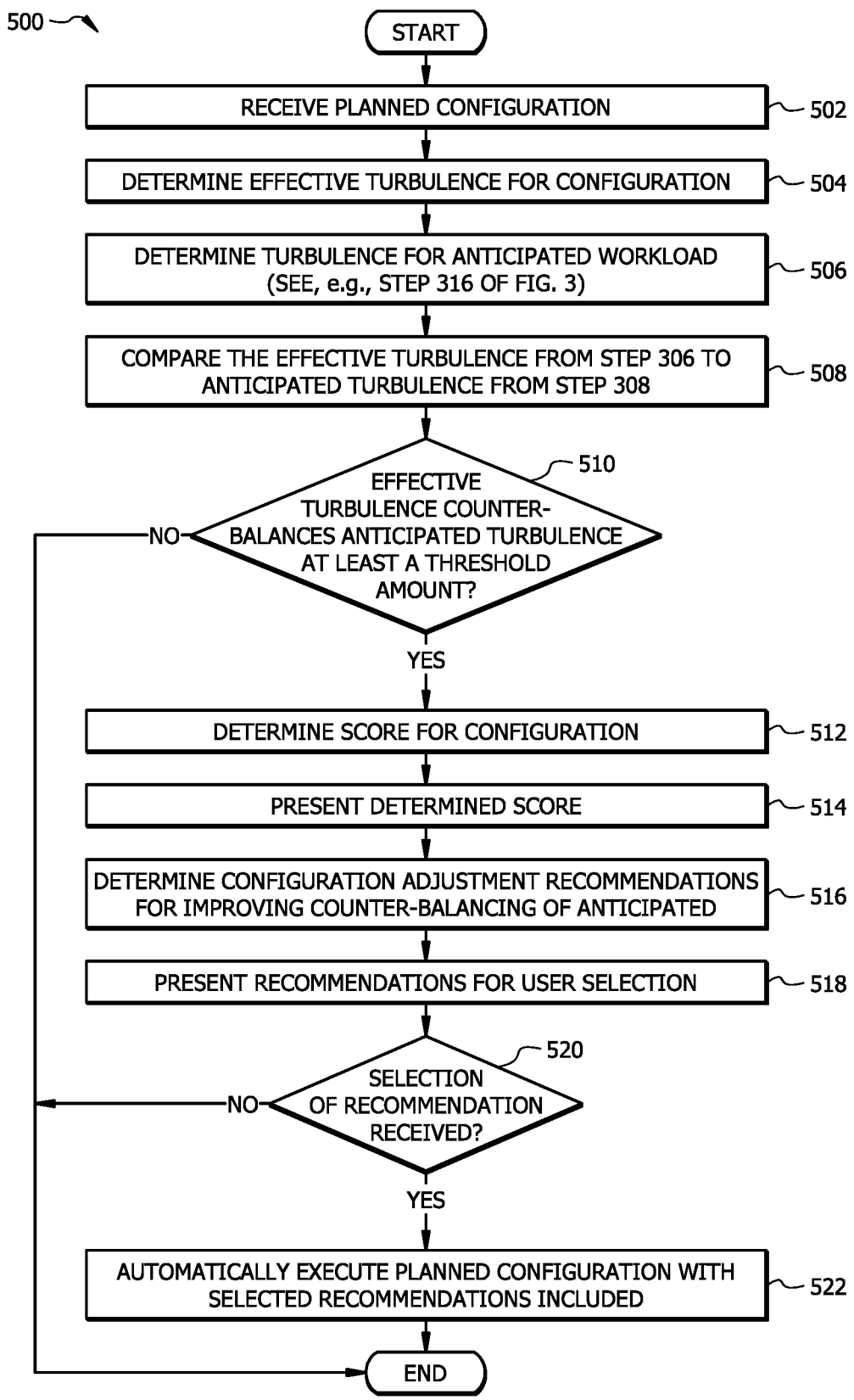
FIG. 5 is a flowchart of a method for evaluating a planned infrastructure configuration for meeting an anticipated workload using the system of FIG. 1.

FIG. 5 illustrates a method 500 for operating the system 100 of FIG. 1 in order to evaluate a planned infrastructure configuration 168. Method 500 may improve the management of computing infrastructure 102 by allowing planned configurations 168 to be evaluated without the trial and error and possible infrastructure downtimes that are associated with previous technology. The method 500 may be executed by the processor 140, memory 142, and interface 144 of the infrastructure management subsystem 138. The method 500 may begin at step 502 where a planned configuration 168 is received. The planned configuration 168 may be a new configuration, a modification of the current configuration, or one of the configurations 162*a-c* determined based on the counter-balancing turbulence 304 (e.g., as determined by method 400 of FIG. 4).

At step 504, an effective turbulence 170 is determined for the planned configuration 168. For example, the effective turbulence 170 may be determined using the same or similar approach described for the determination of the anticipated turbulence 302. The effective turbulence 170 is a quantitative indication of anticipated fluctuations in future infrastructure availability based on the planned infrastructure configuration 168. At step 506, the anticipated turbulence 302 is determined. The anticipated turbulence is determined as described above with respect to FIG. 4 (see step 416).

At step 508, the effective turbulence 170 is compared to the anticipated turbulence 302. At step 510, the infrastructure management subsystem 138 determines, based on the comparison at step 508, whether the effective turbulence 170 counterbalances at least a threshold amount 172 of the anticipated turbulence 302. For example, the infrastructure management subsystem 138 may determine whether fluctuations of the effective turbulence 170 destructively interferes with fluctuations of the anticipated turbulence 302 at least a threshold amount 172. If the effective turbulence 170 does not counter-balance the anticipated turbulence 302 at least the threshold amount 172, the method 500 may end. Otherwise, if the effective turbulence 170 does counter-balance the anticipated turbulence 302 at least the threshold amount 172, the infrastructure management subsystem 138 proceeds to step 512.

At step 512, the infrastructure management subsystem 138 determines a configuration score 176 for the planned configuration 168. For example, the configuration score 176 may indicate an extent to which the fluctuations of the effective turbulence 170 destructively interfere with fluctuations of the anticipated turbulence 302. At step 514, the determined configuration score 176 is provided for presentation (e.g., on a display of a device operated by an administrator of the computing infrastructure 102).

At step 516, the infrastructure management subsystem 138 may determine one or more recommended configurations 174. The recommended configurations 174 may include adjustments to the planned configuration 168 that will improve the configuration score 176. In other words, the recommended configurations 174 may increase the destructive interference between the fluctuations of the effective turbulence 170 and the fluctuations of the anticipated turbulence 302. At step 518, the recommended configurations 174 are provided for presentation (e.g., on a display of a device operated by an administrator of the computing infrastructure 102). The recommended configurations 174 may be provided as options for selection (e.g., via an appropriate user selection 164).

At step 520, the infrastructure management subsystem 138 determines whether a selection of one of the recommended configurations 174 is received. For example, the infrastructure management subsystem 138 may determine whether a user selection 164 is received of one of the presented recommended configurations 174. If a selection is not received, the method 500 may end. If a selection is received, the infrastructure management subsystem 138 proceeds to step 522. At step 522, the planned configuration 168 with the adjustments indicated by the selected recommended configuration 174 is automatically implemented at the computing infrastructure 102.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
  a computing infrastructure comprising a plurality of computing resources configured to implement computing tasks; and
  an infrastructure management subsystem operable to manage the computing infrastructure, the infrastructure management subsystem comprising:
    a communications interface operable to receive:
      a selection of a planned configuration of the computing infrastructure, the planned configuration comprising an indication of availability and allocation of the computing resources to users during future times; and
      a baseline demand comprising a current usage of computing resources of the computing infrastructure; and
    a processor communicatively coupled to the communications interface, the processor configured to:
      determine, based at least in part on the baseline demand and an anticipated future change to the baseline demand, an anticipated turbulence, wherein the anticipated turbulence comprises a quantitative indication of anticipated fluctuations in future infrastructure demand as a function of time;
      determine, based at least in part on the planned infrastructure configuration, an effective turbulence for the planned infrastructure configuration, wherein the effective turbulence comprises a quantitative indication of anticipated fluctuations in future infrastructure availability;
      determine, based at least in part on a comparison of the anticipated turbulence to the effective turbulence, a configuration score corresponding to an extent to which the anticipated fluctuations in the future infrastructure availability of the effective turbulence destructively interfere with the anticipated fluctuations in the future infrastructure demand of the anticipated turbulence;

provide the configuration score for presentation; and in response to receiving a confirmation to execute the planned infrastructure configuration, automatically implement the planned infrastructure configuration at the computing infrastructure.

2. The system of claim 1, wherein the processor is further configured to determine the anticipated turbulence by:

determining a volume, frequency, and complexity of a workload anticipated to be executed by the computing infrastructure;

determining, by applying a scalar-to-vector model to the volume, frequency, and complexity, a velocity and intensity of the workload, wherein the velocity comprises an anticipated change in the volume of the workload per unit time, wherein the intensity comprises a measure of the complexity of the workload per unit time; and determining the anticipated turbulence based at least in part on the determined velocity and intensity.

3. The system of claim 1, wherein the processor if further configured to determine the anticipated turbulence by:

determining, based on the baseline demand and the anticipated future change to the baseline demand, one or more scalar characteristics of the workload anticipated to be executed by the computing infrastructure during future times;

determining, by applying a scalar-to-vector model to the one or more scalar characteristics, a plurality of vector outputs;

determining that a first vector output of the plurality of vector outputs satisfies vector-fit criteria, thereby identifying the first vector output as a selected vector output; and determining the turbulence based on the selected vector output.

4. The system of claim 1, wherein the processor if further configured to determine, based on the comparison of the anticipated turbulence to the effective turbulence, that the effective turbulence comprises fluctuations that destructively interfere with the anticipated fluctuations of the anticipated turbulence at least a threshold amount.

5. The system of claim 1, wherein the processor is further configured to:

determine one or more recommended adjustments to the planned infrastructure configuration; and cause the one or more recommended adjustments to be presented.

6. The system of claim 5, wherein the processor is further configured to:

receive a user selection of one of the presented recommended adjustments; and after receiving the user selection, automatically implement the planned infrastructure configuration with the selected recommended adjustment at the computing infrastructure.

7. The system of claim 1, wherein the processor is further configured to implement the planned infrastructure configuration at the computing infrastructure by adjusting the allocation of the computing resources of the computing infrastructure amongst the users of the computing infrastructure.

8. A method comprising:

receiving a selection of a planned configuration of a computing infrastructure comprising a plurality of computing resources configured to implement computing tasks, the planned configuration comprising an indication of availability and allocation of the computing resources to users during future times;

receiving a baseline demand comprising a current usage of computing resources of the computing infrastructure; and determining, based at least in part on the baseline demand and an anticipated future change to the baseline demand, an anticipated turbulence, wherein the anticipated turbulence comprises a quantitative indication of anticipated fluctuations in future infrastructure demand as a function of time;

determining, based at least in part on the planned infrastructure configuration, an effective turbulence for the planned infrastructure configuration, wherein the effective turbulence comprises a quantitative indication of anticipated fluctuations in future infrastructure availability;

determining, based at least in part on a comparison of the anticipated turbulence to the effective turbulence, a configuration score corresponding to an extent to which the anticipated fluctuations in the future infrastructure availability of the effective turbulence destructively interfere with the anticipated fluctuations in the future infrastructure demand of the anticipated turbulence;

providing the configuration score for presentation; and in response to receiving a confirmation to execute the planned infrastructure configuration, automatically implementing the planned infrastructure configuration at the computing infrastructure.

9. The method of claim 8, further comprising determining the anticipated turbulence by:

determining a volume, frequency, and complexity of a workload anticipated to be executed by the computing infrastructure;

determining, by applying a scalar-to-vector model to the volume, frequency, and complexity, a velocity and intensity of the workload, wherein the velocity comprises an anticipated change in the volume of the workload per unit time, wherein the intensity comprises a measure of the complexity of the workload per unit time; and determining the anticipated turbulence based at least in part on the determined velocity and intensity.

10. The method of claim 8, further comprising determining the anticipated turbulence by:

determining, based on the baseline demand and the anticipated future change to the baseline demand, one or more scalar characteristics of the workload anticipated to be executed by the computing infrastructure during future times;

determining, by applying a scalar-to-vector model to the one or more scalar characteristics, a plurality of vector outputs;

determining that a first vector output of the plurality of vector outputs satisfies vector-fit criteria, thereby identifying the first vector output as a selected vector output; and determining the turbulence based on the selected vector output.

11. The method of claim 8, further comprising determining, based on the comparison of the anticipated turbulence to the effective turbulence, that the effective turbulence comprises fluctuations that destructively interfere with the anticipated fluctuations of the anticipated turbulence at least a threshold amount.

12. The method of claim 8, further comprising:
  determining one or more recommended adjustments to the planned infrastructure configuration;
  causing the one or more recommended adjustments to be presented;
  receiving a user selection of one of the presented recommended adjustments; and
  after receiving the user selection, automatically implementing the planned infrastructure configuration with the selected recommended adjustment at the computing infrastructure.

13. The method of claim 8, further comprising implementing the planned infrastructure configuration at the computing infrastructure by adjusting the allocation of the computing resources of the computing infrastructure amongst the users of the computing infrastructure.

14. A system comprising:
  a communications interface operable to receive:
    a selection of a planned configuration of a computing infrastructure comprising a plurality of computing resources configured to implement computing tasks, the planned configuration comprising an indication of availability and allocation of the computing resources to users during future times; and
    a baseline demand comprising a current usage of computing resources of the computing infrastructure; and
  a processor communicatively coupled to the communications interface, the processor configured to:
    determine, based at least in part on the baseline demand and an anticipated future change to the baseline demand, an anticipated turbulence, wherein the anticipated turbulence comprises a quantitative indication of anticipated fluctuations in future infrastructure demand as a function of time;
    determine, based at least in part on the planned infrastructure configuration, an effective turbulence for the planned infrastructure configuration, wherein the effective turbulence comprises a quantitative indication of anticipated fluctuations in future infrastructure availability;
    determine, based at least in part on a comparison of the anticipated turbulence to the effective turbulence, a configuration score corresponding to an extent to which the anticipated fluctuations in the future infrastructure availability of the effective turbulence destructively interfere with the anticipated fluctuations in the future infrastructure demand of the anticipated turbulence;
    provide the configuration score for presentation; and
    in response to receiving a confirmation to execute the planned infrastructure configuration, automatically implement the planned infrastructure configuration at the computing infrastructure.

15. The system of claim 14, wherein the processor is further configured to determine the anticipated turbulence by:
  determining a volume, frequency, and complexity of a workload anticipated to be executed by the computing infrastructure;
  determining, by applying a scalar-to-vector model to the volume, frequency, and complexity, a velocity and intensity of the workload, wherein the velocity comprises an anticipated change in the volume of the workload per unit time, wherein the intensity comprises a measure of the complexity of the workload per unit time; and
  determining the anticipated turbulence based at least in part on the determined velocity and intensity.

16. The system of claim 14, wherein the processor if further configured to determine the anticipated turbulence by:
  determining, based on the baseline demand and the anticipated future change to the baseline demand, one or more scalar characteristics of the workload anticipated to be executed by the computing infrastructure during future times;
  determining, by applying a scalar-to-vector model to the one or more scalar characteristics, a plurality of vector outputs;
  determining that a first vector output of the plurality of vector outputs satisfies vector-fit criteria, thereby identifying the first vector output as a selected vector output; and
  determining the turbulence based on the selected vector output.

17. The system of claim 14, wherein the processor if further configured to determine, based on the comparison of the anticipated turbulence to the effective turbulence, that the effective turbulence comprises fluctuations that destructively interfere with the anticipated fluctuations of the anticipated turbulence at least a threshold amount.

18. The system of claim 14, wherein the processor is further configured to:
  determine one or more recommended adjustments to the planned infrastructure configuration; and
  cause the one or more recommended adjustments to be presented.

19. The system of claim 18, wherein the processor is further configured to:
  receive a user selection of one of the presented recommended adjustments; and
  after receiving the user selection, automatically implement the planned infrastructure configuration with the selected recommended adjustment at the computing infrastructure.

20. The system of claim 14, wherein the processor is further configured to implement the planned infrastructure configuration at the computing infrastructure by adjusting the allocation of the computing resources of the computing infrastructure amongst the users of the computing infrastructure.

* * * * *